United States Patent
Roll et al.

[11] Patent Number: 5,481,638
[45] Date of Patent: Jan. 2, 1996

[54] TECHNIQUES FOR STRIPPING OPTICAL FIBER ENCAPSULANTS

[75] Inventors: Richard A. Roll, West Trenton; Muhammed A. Shahid, Ewing Township, Mercer County, N.J.

[73] Assignee: AT&T Corp., Murray Hill, N.J.

[21] Appl. No.: 270,336

[22] Filed: Jul. 5, 1994

[51] Int. Cl.$^6$ .................................................. H02G 1/12
[52] U.S. Cl. ........................... 385/134; 30/90.1; 30/279.2; 81/9.4; 385/147
[58] Field of Search ............................. 385/85, 114, 134, 385/147; 30/90.1, 90.4, 90.8, 279.2, 280; 81/9.4, 9.44, 9.51

[56] References Cited

U.S. PATENT DOCUMENTS

| | | | |
|---|---|---|---|
| 4,046,298 | 9/1977 | Schroeder, Jr. | 385/114 X |
| 4,188,841 | 2/1980 | Nakamura et al. | 81/9.51 |
| 4,394,828 | 7/1983 | Garbis et al. | 81/9.51 |
| 4,434,554 | 3/1984 | Korbelak | 30/90.8 |
| 4,748,871 | 6/1988 | Zdzislaw | 81/9.4 |
| 5,268,981 | 12/1993 | Shahid | 385/71 |
| 5,287,426 | 2/1994 | Shahid | 385/85 |
| 5,295,421 | 3/1994 | Mansfield | 81/9.4 |
| 5,361,384 | 11/1994 | Stepan | 385/134 |
| 5,377,564 | 1/1995 | Erlich | 81/9.44 |

Primary Examiner—John D. Lee
Attorney, Agent, or Firm—Roderick B. Anderson; Jeffrey M. Weinick

[57] ABSTRACT

A first portion of an optical fiber encapsulant is selectively removed by softening it; i.e., converting the first portion from a solid state to a partly fluid state, as by exposure to an appropriate chemical. The first portion (12) is then penetrated with at least first and second knife edges (14, 15), the penetration being on opposite sides of the optical fiber (10). The first portion of the encapsulant is removed from the optical fiber by providing relative movement between the knife edges and the optical fiber, the movement being in the direction of the central axis of the fiber, thereby to gather at least part of the first portion of the encapsulant on the knife edges. In a preferred embodiment, third and fourth knife edges (16, 17) the also included on opposite sides of the optical fiber. The optical fiber (10) may be part of an optical fiber ribbon (11), and the first portion of the encapsulant is moved by moving the first and second knife edges (14, 15), and the third and fourth knife edges (16, 17) toward each other. All four of the knife edges are preferably contained within a cavity (38) which is connected to a fluid line (42, 43) so that fluid can flush the encapsulant that has been gathered on the knife edges.

25 Claims, 3 Drawing Sheets

FIG. 3
FIG. 4
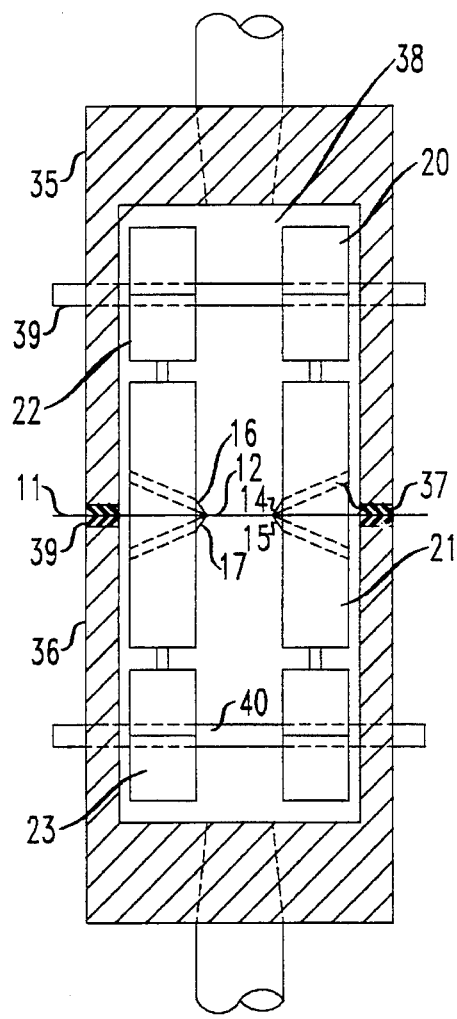
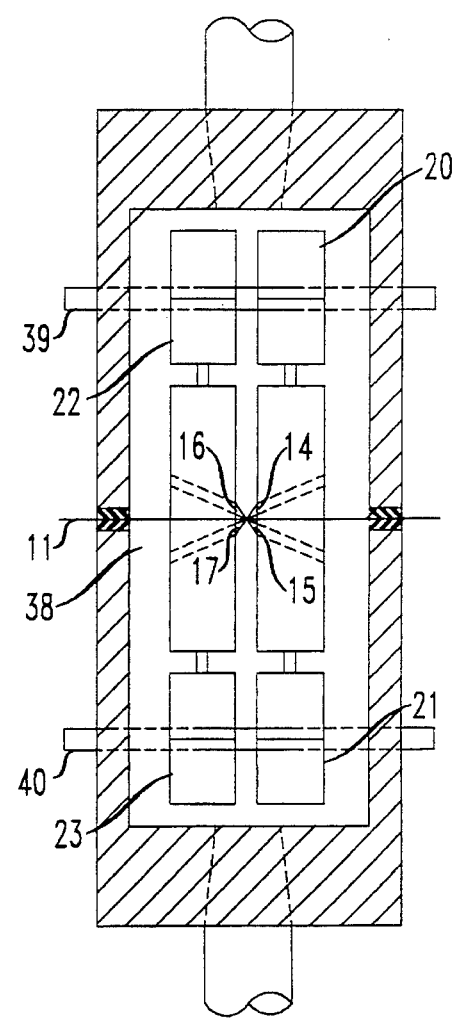

TECHNIQUES FOR STRIPPING OPTICAL FIBER ENCAPSULANTS

TECHNICAL FIELD

This invention relates to arrays of parallel optical fibers, each being covered by a plastic encapsulant, and, more particularly, to techniques for selectively stripping the encapsulant from such fibers or arrays.

BACKGROUND OF THE INVENTION

One popular form in which optical fibers are marketed is as optical fiber ribbons, each ribbon comprising an array of parallel optical fibers joined and encapsulated by an plastic encapsulant. Optical fiber ribbons are mass-produced and are often marketed in the form of reels, that is, a length of optical fiber ribbon wound around a cylinder or spool. The U.S. patent of Shahid, No. 5,287,426, granted Feb. 15, 1994, incorporated herein by reference, describes a method for forming a plurality of connectors on an optical fiber ribbon such that, when a length of the ribbon is to be used, the ribbon can be severed by cutting through a connector. Thus, optical fiber ribbons can be marketed in the form of reels with the connectors being periodically located along the ribbon which is stored on the reel.

One step in making such connectors is to strip the plastic encapsulant from that part of the optical fiber ribbon on which the connector is to be formed. The Shahid patent teaches that this can be done by exposing the ribbon segment to a chemical which softens it so that it can be manually removed. Manual removal of the softened encapsulant, however, is somewhat inconsistent with machine production of the optical fiber ribbon. It would be desirable to reduce the manual skill and time needed to remove the softened encapsulant from arrays of optical fibers such as optical fiber ribbons.

SUMMARY OF THE INVENTION

In an illustrative embodiment, a first portion of an optical fiber encapsulant is selectively removed, first, by softening it; i.e., converting the first portion from a solid state to a partly fluid state, as by exposure to an appropriate chemical. The first portion is then penetrated with at least first and second knife edges, the penetration being on opposite sides of the optical fiber. The first portion of the encapsulant is removed from the optical fiber by providing relative movement between the knife edges and the optical fiber the movement being in the direction of the central axis of the fiber, thereby to gather at least part of the first portion of the encapsulant on the knife edges. Thereafter, fluid is directed over the knife edges to remove the softened encapsulant.

In a preferred embodiment, third and fourth knife edges are also included on opposite sides of the optical fiber. The optical fiber may be part of an optical fiber ribbon, and the first portion of the encapsulant is moved by moving the first and second knife edges, and the third and fourth knife edges toward each other. All four of the knife edges are preferably contained within a cavity which is connected to a fluid line so that fluid can flush away the encapsulant that has been gathered on the knife edges.

These and other features, benefits and advantages of the invention will be better understood from a consideration of the following detailed description taken in conjunction with the accompanying drawing.

BRIEF DESCRIPTION OF THE DRAWING

FIG. 3 is a view of the apparatus of FIG. 1 at a later stage of its operation;

FIGS. 4 and 5 are views of the apparatus of FIG. 1 at still later stages of its operation.

DETAILED DESCRIPTION

Figure 2:
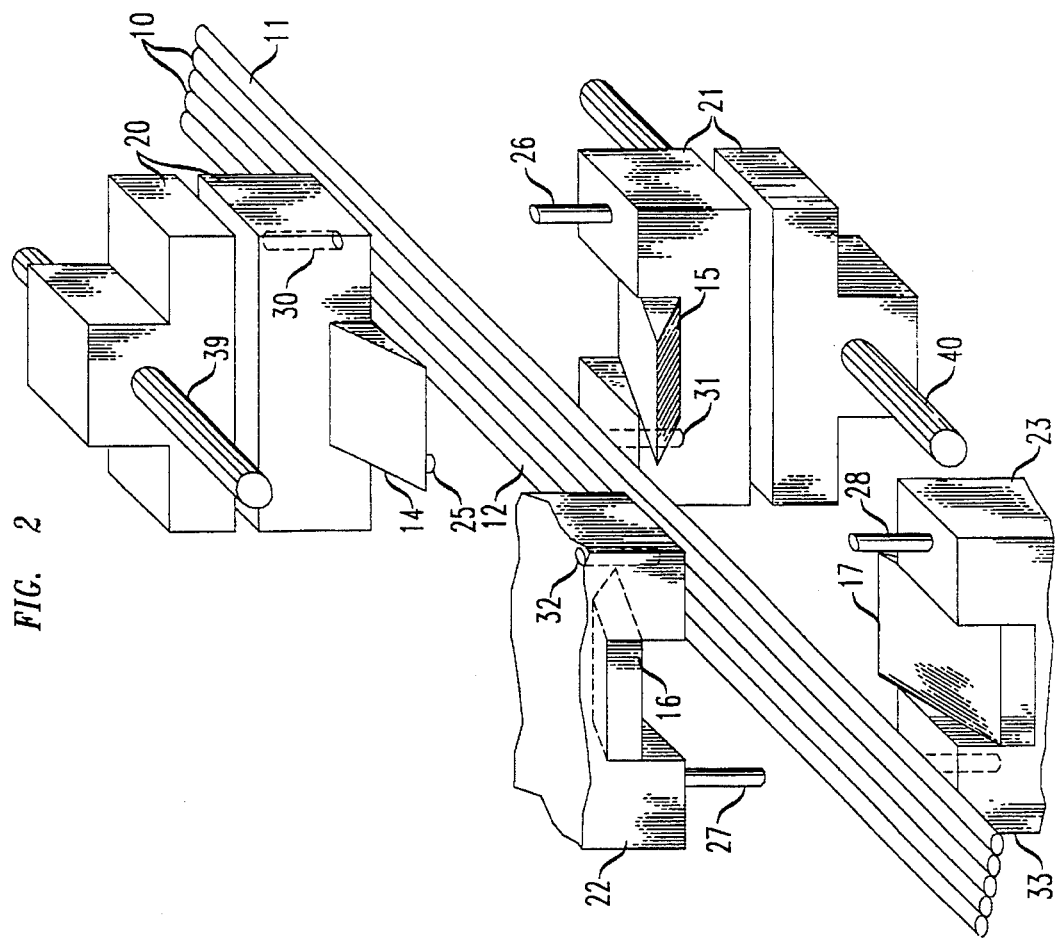
FIG. 2 is a perspective view of part of the apparatus of FIG. 1.
Figure 1:
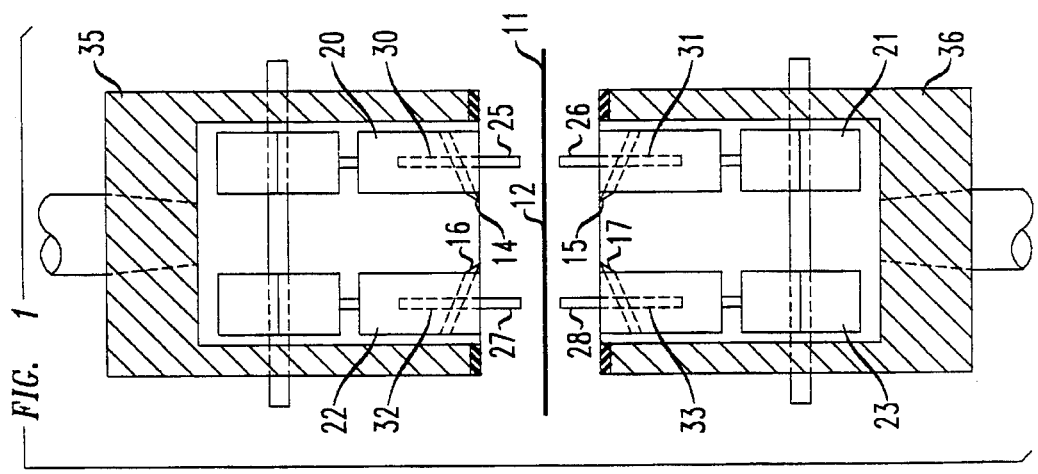
FIG. 1 is a schematic sectional view of apparatus for stripping part of the encapsulation of an optical fiber ribbon.

The drawings are schematic and not necessarily to scale, with certain dimensions being distorted to aid in clarity of exposition. Referring to FIGS. 1 and 2, an optical fiber ribbon 11 comprises an array of optical fibers 10 joined together and encapsulated by a plastic encapsulant. To provide the ribbon with optical fiber connectors, as described in the aforementioned Shahid patent, a first portion 12 of the optical fiber ribbon has been exposed to a chemical such as methylene chloride to soften the plastic encapsulant, i.e., to convert it from a solid state to a partially fluid state. The purpose of the apparatus of FIGS. 1 and 2 is to strip the softened encapsulant from the optical fibers so that connectors can be applied to portions of the optical fibers that have been exposed by such stripping.

Located on opposite sides of the softened ribbon portion 12 are first and second knife edges 14 and 15, and third and fourth knife edges 16 and 17. As shown more clearly in FIG. 2, first knife edge 14 is held within a first member 20, second knife edge 15 is held within a second member 21, third knife edge 16 is held within a third member 22 and fourth knife edge 17 is held within a fourth member 23. Respectively extending from members 20, 21, 22 and 23 are alignment pins 25, 26, 27 and 28. The members 20-23 also respectively contain alignment apertures 30, 31, 32 and 33 adapted to engage opposite alignment pins 25–28. The first and third members 20 and 22 are contained within an enclosure 35, while members 21 and 23 are contained within an enclosure 36. The enclosures 35 and 36 are arranged such that the softened portion 12 of the ribbon lies between the enclosures and between knife edges 14 and 16.

Referring to FIG. 3, the next step in a stripping operation is to clamp together enclosures 35 and 36 such that the various alignment pins 25–28 fit into matching alignment apertures 30–33 (shown in FIGS. 1 and 2). The abutting surfaces of enclosures 35 and 36 include rubber gaskets 37 and 39 which are sufficiently pliable to form between them a water-tight seal. Thus, when they are clamped together, enclosures 35 and 36 form a cavity 38. The first and third members 20 and 22 are contained within the cavity and are slideably mounted on a rod 39. Similarly, members 21 and 23 are slideably mounted on a rod 40. The optical fiber 11 extends between gaskets 37 and 39, which are sufficiently pliable to provide the water-fight seal even with the ribbon between them. Forcing the enclosures 35 and 36 together spaces knife edges 14 and 15, and knife edges 16 and 17, on opposite sides of the first portion 12 at a predetermined distance from the optical fibers. As will be explained more fully later, the knife edges penetrate the softened portion 12, but preferably do not actually contact the glass optical fibers contained within the softened portion 12. The optical fiber 11 is preferably under tension so that it lies substantially along a straight line.

Referring to FIG. 4, the next step in the operation is to drive together, as shown, the opposing knife edges 15 and 17, and 14 and 16. This is done by driving together members 20 and 22 on rod 39, and members 21 and 23 on rod 40. Since the knife edges have penetrated the softened part of the encapsulation, the knife edges scoop the softened encapsulation and cause it to gather on their surfaces.

Figure 5:
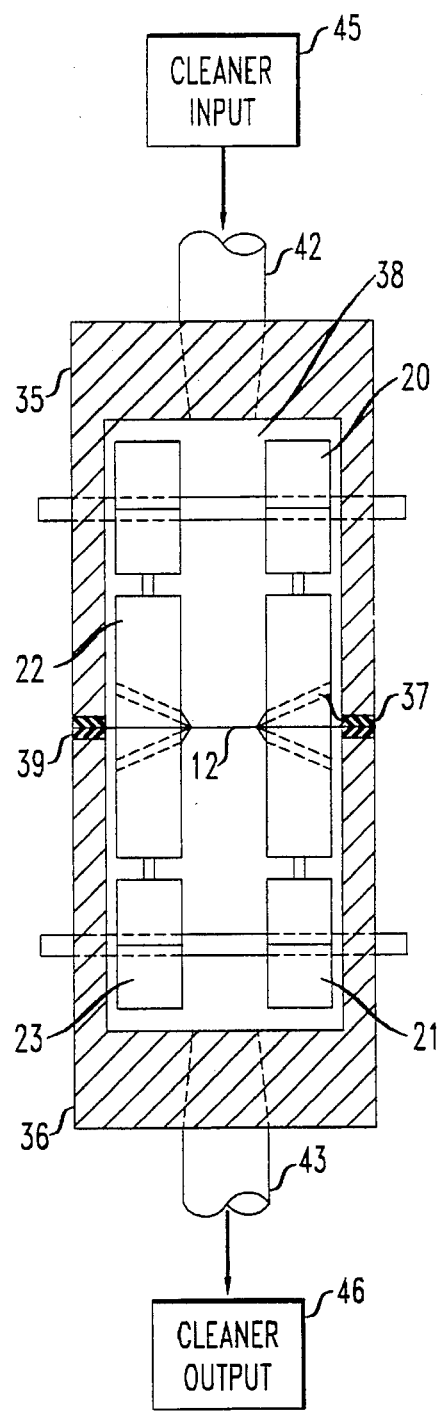

Referring to FIG. 5, the members 20, 22, 21 and 23 are returned to their original positions. Included respectively in enclosures 35 and 36 are ducts 42 and 43 communicating with cavity 38. Duct 42 is connected to a source 45 of a fluid cleaner, and duct 43 is connected to a cleaner output 46. After the knife edges have scraped the softened encapsulant from the fibers, a cleaner fluid such as ethanol is forced under pressure through ducts 42 and 43. In this manner, the encapsulant gathered on the knife edges is flushed away, as is any remnant encapsulant that may be on the optical fiber of ribbon portion 12. It is intended that cavity 38 should be water-tight so that there is no leaking as the cleaner fluid is directed through it. The cleaner output at 46 is taken as a waste product of the process.

The motion of the members 20–23 of FIGS. 4 and 5 is preferably controlled by drive shafts extending into the cavity 38 which, for reasons of simplicity, have not been shown. The drive shafts are surrounded by appropriate gaskets to maintain the cavity in its water-tight condition.

Figure 6:
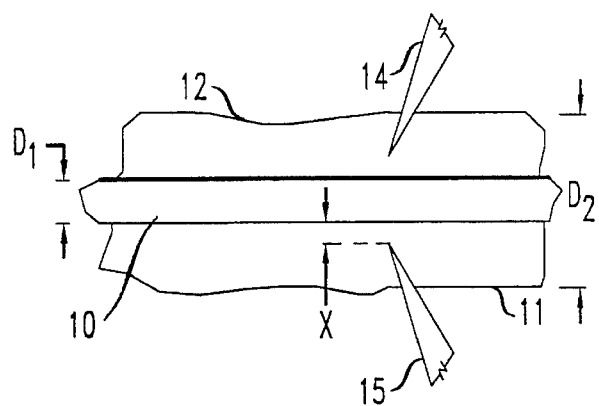
FIG. 6 is a schematic view illustrating how knife edges of the apparatus of FIG. 1 can grasp the softened encapsulant of an optical fiber ribbon.

The optical fiber ribbon encapsulant is preferably acrylate, which can be softened by exposure to methylene chloride. Referring to FIG. 6, there is shown a schematic view of the knife edges 14 and 16 as they penetrate the softened portion 12, as shown in FIG. 3. The softened acrylate covers an optical fiber 10 which is one of the fibers of the optical fiber ribbon 11. The optical fiber 10 is typically glass having an outside diameter $D_1$ of one hundred twenty-five microns. The acrylate plastic encapsulant may have an outside diameter or thickness $D_2$ of two hundred fifty microns.

The apparatus of FIGS. 3–5 may be designed such that, when the knife edges 14 and 16 penetrate the encapsulant, they remain a distance x away from the optical fiber 10 of twenty-five to thirty microns. This allows sufficient penetration so that the softened encapsulant 12 can be scooped away by the knife edges without the knife edges touching or damaging the optical fiber 10. Acrylate that has been softened by methylene chloride has a gel-like consistency that allows it to be pulled away from the optical fiber 10 as the knife edges move relative to the optical fiber. The upper and lower surfaces of both knife edges 16 and 17 are at an angle with respect to fiber 10 of less than ninety degrees. This allows the encapsulant to be gathered on the upper surface of knife edge 16 and the lower surface of knife edge 14 as the knife edges move with respect to the optical fiber 10.

The process that has been described is designed to be part of the process defined in the aforementioned Shahid patent for providing connectors to an optical fiber ribbon. As is described therein, and as described in the copending application of Roll et al., Ser. No. 08/186,935, filed Jan. 27, 1994, (now U.S. Pat. No. 5,388,174) incorporated by reference herein, this process is amenable to automation because the connectors can be placed by machines on the ribbons. One can appreciate that eliminating the need for manual removal of the softened encapsulant constitutes a significant step toward complete automation of the "connectorization" process. The invention is also applicable to the process of providing connectors to flexible plastic optical backplanes, as described in the U.S. Pat. No. 5,268,981 to Shahid.

We have found that the invention works very rapidly and effectively with the two pairs of knife edges being forced together, as shown in FIG. 4. One could alternatively keep one pair of knife edges, such as 14 and 15, stationary and move only the other pair. Alternatively, only a single pair of knife edges could be used. The knife edges could be held stationary with the optical ribbon being moved to provide the needed relative movement for scraping clear the softened encapsulation. Various alternatives such as methanol can be used in place of the ethanol cleaner in the FIG. 5 step. While methylene chloride is preferred for softening the acrylate encapsulant, other materials such as various paint strippers could be used. If a different plastic is used for the encapsulation, other chemicals for softening it might be preferred. In fact, heating can be used for softening the acrylate encapsulation. Various other embodiments and modifications may be made by those skilled in the art without departing from the spirit and scope of the invention.

We claim:

1. An encapsulation removal method comprising:

convening a first portion of an encapsulation of at least one optical fiber having a central axis from a solid state to a partly fluid state;

penetrating the first portion with at least first and second knife edges, the penetrations being on opposite sides of said optical fiber;

removing at least part of the first portion of the encapsulation comprising the step of providing relative movement between the knife edges and the optical fiber, said movement being in the direction of said central axis, thereby to gather at least part of the first portion of the encapsulation on said knife edges;

and removing at least part of the encapsulation from said knife edges comprising directing fluid over the knife edges.

2. The method of claim 1 wherein:

the first knife edge is mounted in a first member having a first alignment pin and a first alignment aperture;

the second knife edge is mounted in a second member having a second alignment pin and a second alignment aperture;

the penetration step comprises the step of fitting the first alignment pin into the second aperture and the second alignment pin into the first aperture and moving the first and second member toward each other;

the first and second alignment pins and alignment apertures each extending substantially perpendicularly to said central axis.

3. The method of claim 1 wherein:

said encapsulation is an acrylate;

and the converting step comprises exposing the first portion to methylene chloride.

4. The method of claim 1 wherein:

the first knife edge is mounted in a first member;

the second knife edge is mounted in a second member;

the penetration step comprises the step of locating the first portion in a substantially water-tight cavity including the first and second members;

and the directing step comprises directing fluid through the cavity in a direction substantially perpendicular to said central axis.

5. The method of claim 1 wherein:

the first knife edge is mounted in a first member slideably mounted on a first rod;

the second knife edge is mounted in a second member slideably mounted on a second rod;

the first and second rods extend in a direction substantially parallel to said central axis;

and the step of providing relative movement comprises simultaneously sliding the first and second members respectively on the first and second rods.

6. The method of claim 1 wherein:

the optical fiber is made of glass;

and neither of the knife edges contacts the optical fiber.

7. The method of claim 1 wherein:

the first knife edge is arranged above the optical fiber and has upper and lower surfaces both at an angle of less than ninety degrees with respect to the central axis;

the second knife edge is arranged below the optical fiber and has upper and lower surfaces both at an angle of less than ninety degrees with respect to the central axis;

and the step of providing relative movement causes at least part of the first portion of the encapsulation to gather on the upper surface of the first knife edge and another part of the first portion of the encapsulation to gather on the lower surface of the second knife edge.

8. The method of claim 1 wherein:

the optical fiber is part of an optical fiber ribbon comprising an array of optical fibers bound together by a common encapsulation;

the first portion of the encapsulation covers a predetermined axial length of all of the optical fiber ribbon;

and the penetrating step comprises penetrating substantially the entire width of the first portion along a line that is substantially transverse to the central axis.

9. The method of claim 1 wherein:

the penetrating step further comprises penetrating the first portion with third and fourth knife edges;

the third and fourth knife edges penetrate the first portion on opposite sides of the optical fiber at an axial location removed from the first and second knife edges;

and the step of providing relative movement comprises moving the first and second knife edges toward the third and fourth knife edges, and moving the third and fourth knife edges toward the first and second knife edges.

10. The method of claim 9 wherein:

the first knife edge is mounted in a first member slideably mounted on a first rod;

the second knife edge is mounted in a second member slideably mounted on a second rod;

the third knife edge is mounted in a third member slideably mounted on the first rod;

the fourth knife edge is mounted in a fourth member slideably mounted on the second rod;

and the step of providing relative movement comprises simultaneously sliding the first and second members in one direction on the first and second rods, and sliding the third and fourth members in another direction on the first and second rods.

11. The method of claim 10 wherein:

the first member has a first alignment pin and a first alignment aperture, the second member has a second alignment pin and a second alignment aperture, the third member has a third alignment pin and a third alignment aperture, and the fourth member has a fourth alignment pin and a fourth alignment aperture;

the first alignment pin is inserted in the second alignment aperture, the second alignment pin is inserted in the first alignment aperture, the third alignment pin is inserted in the fourth alignment aperture, and the fourth alignment pin is inserted in the fourth alignment aperture;

the first, second, third and fourth alignment pins and the first, second, third and fourth alignment apertures are each substantially perpendicular to said central axis.

12. The method of claim 11 wherein:

the encapsulation is an acrylate;

and the converting step comprises exposing the first portion to methylene chloride.

13. The method of claim 12 wherein:

the penetrating step comprises the step of locating the first portion in a substantially water-tight cavity including the first, second, third and fourth knife edges;

and the directing step comprises directing fluid through the cavity in a direction substantially perpendicular to said central axis.

14. The method of claim 13 wherein:

the optical fibers are made of glass;

and none of the knife edges contacts any of the optical fibers.

15. The method of claim 14 wherein:

the optical fiber is part of an optical fiber ribbon comprising an array of parallel optical fibers bound together by a common encapsulant;

the first portion of the encapsulant covers a predetermined axial length of all of the optical fiber ribbons;

and the penetrating step comprises penetrating substantially the entire width of the first portion along lines transverse to the central axis with said first, second, third and fourth knife edges.

16. A method for removing encapsulant portions of arrays of optical fibers comprising the steps of:

slideably mounting first and third members on a first rod extending across a first opening of a first enclosure having a first duct;

slideably mounting second and fourth members on a second rod extending across a second opening of a second enclosure having a second duct;

the first, second, third and fourth members respectively having mounted thereon first, second, third and fourth knife edges;

softening part of the plastic encapsulant of an array of parallel optical fibers;

positioning that part of the optical fibers covered by the soft part of the encapsulant between the first and second enclosures, facing the first, second, third and fourth knife edges, and parallel to the first and second rods;

causing the first, second, third and fourth knife edges to penetrate the softened portion of the encapsulant;

said causing step comprising clamping together the first and second enclosures such that the first and second openings combine to form a cavity;

stripping at least part of the softened encapsulant from said optical fibers comprising the step of moving at least the first and second knife edges with respect to the optical fibers;

the moving step comprising sliding the first and second members in the same direction along the first and second rods;

and flushing the softened encapsulant comprising directing fluid through the first duct, the cavity and the second duct.

17. The method of claim 16 wherein:

the sliding step comprises sliding the first and second members in a first direction;

and simultaneously with sliding tile first and second members in the first direction, the third and fourth members are slid on the first and second rods in a second direction opposite the first direction.

18. The method of claim 16 wherein:

the first member contains a first alignment pin and a first alignment aperture;

the second member contains a second alignment pin and a second alignment aperture;

the clamping step comprises the step of fitting the first alignment pin into the second aperture and the second alignment pin into the first aperture, and moving the first and second enclosures toward each other;

the first and second alignment pins and alignment apertures each extending substantially perpendicular to the optical fibers.

19. The method of claim 16 wherein:

the encapsulation is an acrylate;

and the softening step comprises exposing pan of the plastic encapsulant to methylene chloride.

20. The method of claim 16 wherein:

the optical fibers are made of glass;

and none of the knife edges contacts the optical fibers.

21. The method of claim 16 wherein:

the first knife edge is arranged above the optical fiber and has upper and lower surfaces both at an angle of less than ninety degrees with respect to the optical fibers;

the second knife edge is arranged below the optical fibers and has upper and lower surfaces both at angles of less than ninety degrees with respect to the optical fibers;

and the step of moving the first and second knife edges causes at least part of the softened portion of the encapsulation to gather on the upper surface of the first knife edge and another part of the softened portion of the encapsulation to gather on the lower surface of the second knife edge.

22. The method of claim 16 wherein:

the optical fibers are part of an optical fiber ribbon comprising an array of optical fibers bound together by a common encapsulation;

the softened portion of the encapsulation covers a predetermined axial length of all of the optical fiber ribbon;

and the penetrating step comprises penetrating substantially the entire width of the softened portion along a line that is substantially transverse to the optical fibers.

23. The method of claim 16 wherein:

the first member has a first alignment pin and a first alignment aperture, the second member has a second alignment pin and a second alignment aperture, the third member has a third alignment pin and a third alignment aperture, and the fourth member has a fourth alignment pin and a fourth alignment aperture;

the first alignment pin is inserted in the second alignment aperture, the second alignment pin is inserted in the first alignment aperture, the third alignment pin is inserted in the fourth alignment aperture, and the fourth alignment pin is inserted in the third alignment aperture;

the first, second, third and fourth alignment pins and the first, second, third and fourth alignment apertures are each substantially perpendicular to said optical fibers.

24. The method of claim 16 wherein:

the optical fibers each have an outside diameter of approximately one hundred twenty-five microns;

the thickness of the encapsulant including the optical fibers is approximately two hundred fifty microns;

and during the stripping step, the knife edges remain a distance of twenty-five to thirty microns from the optical fibers.

25. The method of claim 16 wherein:

the first enclosure contains a first gasket surrounding the first opening;

the second enclosure includes a second gasket surrounding the second opening;

and the clamping step comprises clamping together the first and second gaskets.

* * * * *